United States Patent
Schreckenberg

(10) Patent No.: US 9,324,185 B2
(45) Date of Patent: Apr. 26, 2016

(54) PROCESS FOR CREATING A MODEL OF A SURFACE OF A CAVITY WALL

(75) Inventor: Marcus Schreckenberg, Freising (DE)

(73) Assignee: TOMTEC IMAGING SYSTEMS GMBH (DE)

( * ) Notice: Subject to any disclaimer, the term of this patent is extended or adjusted under 35 U.S.C. 154(b) by 307 days.

(21) Appl. No.: 13/597,609

(22) Filed: Aug. 29, 2012

(65) Prior Publication Data

US 2013/0057548 A1    Mar. 7, 2013

(30) Foreign Application Priority Data

Sep. 1, 2011   (DE) .......................... 10 2011 081 987

(51) Int. Cl.
  *G06T 17/00*   (2006.01)
  *G06T 7/00*   (2006.01)

(52) U.S. Cl.
  CPC ............... *G06T 17/00* (2013.01); *G06T 7/0012* (2013.01); *G06T 7/0083* (2013.01); *G06T 7/0087* (2013.01); *G06T 7/0089* (2013.01); *G06T 2200/08* (2013.01); *G06T 2207/10088* (2013.01); *G06T 2207/10104* (2013.01); *G06T 2207/10132* (2013.01); *G06T 2207/10136* (2013.01); *G06T 2207/20076* (2013.01); *G06T 2207/30048* (2013.01); *G06T 2207/30101* (2013.01); *G06T 2210/41* (2013.01)

(58) Field of Classification Search
  USPC .............................. 345/419, 420, 424; 604/22
  See application file for complete search history.

(56) References Cited

U.S. PATENT DOCUMENTS

| | | | |
|---|---|---|---|
| 5,435,310 A | 7/1995 | Sheehan et al. | |
| 5,601,084 A | 2/1997 | Sheehan et al. | |
| 6,591,004 B1 * | 7/2003 | VanEssen et al. | 382/154 |
| 7,538,764 B2 * | 5/2009 | Salomie | 345/420 |
| 7,864,173 B2 * | 1/2011 | Handley et al. | 345/420 |
| 7,916,919 B2 * | 3/2011 | Zheng et al. | 382/131 |
| 8,098,918 B2 * | 1/2012 | Zheng et al. | 382/131 |
| 2005/0207630 A1 * | 9/2005 | Chan | A61B 6/466 382/131 |
| 2008/0132788 A1 | 6/2008 | Schreckenberg et al. | |

(Continued)

FOREIGN PATENT DOCUMENTS

CN     101249019 A     8/2008

OTHER PUBLICATIONS

British Office Action for corresponding application No. GB1215408.4; Dated Feb. 1, 2013.

(Continued)

*Primary Examiner* — Kimbinh T Nguyen
(74) *Attorney, Agent, or Firm* — Cantor Colburn LLP

(57) ABSTRACT

A process for creating a surface model of a surface of a cavity wall (2), especially a heart chamber including the steps of: (a) accessing at least one three dimensional image data record of the cavity; (b) creating a preliminary deformable surface model of the interior surface or the exterior surface of the cavity wall for each three dimensional image data record; (c) dividing the surface of the preliminary surface model into surface segments; (d) defining volume segments each including one surface segment and extending radially inwards and/or outwards from their associated surface segment; (e) statistical analysis of the grey levels of the voxels present in the volume segments for analyzing the volume proportion of the cavity wall, in the respective volume segment; and (f) deforming the surface segments on the basis of the volume proportion thus creating a corrected surface model.

11 Claims, 3 Drawing Sheets

(56) References Cited

U.S. PATENT DOCUMENTS

2009/0190811 A1     7/2009    Zheng et al.
2014/0003695 A1*   1/2014    Dean et al. .................. 382/131

OTHER PUBLICATIONS

Peter Santago, "Statistical Models of Partial Volume Effect", IEE Transactions on Image Processing, vol. 4, No. 11, Nov. 1995, pp. 1531-1540.

Tali Sharir, "Quantitative Analysis of Regional Motion and Thickening by Gated Myocardial Perfusion SPECT: Normal Heterogeneity and Criyeria for Abnormality", The Journal of Nuclear Medicine, vol. 42, No. 11, Nov. 2011, 1630-1638.

Cerqueira et al.; "Standardized Myocardial Segmentation and Nomenclature for Tomographic Imaging of the Heart" American Heart Association Writing Group on Myocardial Segmentation and Registration for Cardiac Imaging; Online; Downloaded from http://circ.ahajournals.org; Jan. 29, 2002; pp. 539-542.

* cited by examiner

PROCESS FOR CREATING A MODEL OF A SURFACE OF A CAVITY WALL

TECHNICAL FIELD

The disclosure relates to a process for creating a surface model of a surface of a cavity wall surrounding the cavity, especially for cavities of the human body, such as blood vessels and heart chambers.

BRIEF DESCRIPTION OF RELATED ART

Medical imaging processes such as magnetic resonance tomography (MRI), X-ray angiography, positron emission tomography (PET) and ultrasound imaging, especially with transesophageal probes (TEE) allow for relatively good, even partly time resolved, representations of the human heart. Functional parameters of the heart such as for example the blood volume in a ventricle at a specific time or the ejection fraction, i.e. the percentage of blood which is ejected by the heart chamber during one heart beat may thereby principally be determined. Previously known processes, such as for example disc-summation wherein the heart's interior wall is encompassed by a stack of short-axis segments of the heart are however not very precise showing great inter and intra-observer differences.

Furthermore processes for volume measurement of a corresponding cavity already exist wherein a surface model of the interior surface of the cavity is established which mostly will be defined parametrically, for example by way of individual points on the surface which will be triangularized to be represented.

Principally such surface models are more precise than disc-summation generally having a smaller number of discs. Basically both processes however suffer from the problem that the interior space of the left ventricle is not smoothly edged. Instead the interior is lined with the so called trabeculae. These trabeculae are individual muscle strands which partly extend deep into the heart's interior space. Besides the function thereof in fluid dynamics these fibers also contribute both to the movement of the cardiac wall and the displacement of blood volume by actively contracting and thickening. There is a steady transition between the fibrous trabeculae and the solid heart muscle.

Given the necessarily clear definition of the boundary surface between the muscle wall and interior space one has to establish a decision-making function. This may for example be done by way of the local muscle density (gray value). Above a certain threshold the muscle will be considered as being solid. All lower values cause assignment to the interior space. It is obvious that selection of the threshold greatly influences geometry. Equally obvious however is the fact that this definition is highly subjective or even arbitrarily.

For example in a process of contour detection for MRI-data such a decision-making function may be defined by the analysis of grey levels and by an appropriate decision-making threshold. However, larger interior structures such as papillary muscles already at this point require complex topologies of the surface model, unless they are to be totally neglected. During contraction of the heart muscle the trabeculae thicken thereby increasing the local muscle density and accordingly driving the boundary surface to migrate toward the interior.

If, for the monitoring of the surface one uses feature-tracking-processes tracking specific structures in timely sequential pictures one will end up in a dilemma: the tracker keeps trying to track striking structures, even in the radial direction. According to definition an increase in grey levels shall be ignored. In the case that the boundary surface was defined end-diastolically, thickening of the trabeculae will not express itself in a radial inward movement. Thus surface detection processes which are based on the analysis of grey level densities, and tracking processes which track local grey level textures will lead to results which principally differ from each other.

Thus, calculation of the encompassed volumes of surface models often fails to perform abstraction from reality itself: many hollow bodies, especially in the field of medicine are not adequately smooth-edged for enabling imaging which is precise enough, as a topologically simple surface model. It is true that as to the left ventricle of the human heart a smooth surface model was able to be implemented for the analysis of regional movement of the wall (Bag Model) however, a problem still persists concerning measurement of the encompassed volume and data therefrom derived.

BRIEF SUMMARY

A process is provided for creating a surface model of a surface of a cavity taking adequately into account even an interior surface of the cavity which is not sufficiently smooth as well as structures which are enclosed (e.g. papillary muscles).

Initially a preliminary—preferably also dynamic—surface model of the cavity which is deformable is established, for example by region-growing, threshold procedures, edge and contour detection, respectively, adaptive shape models or 3D-feature-tracking-processes. The thusly identified surface then will be approximated by way of for example a preferably predetermined B-Spline-Model, Shape-Model or another model, the parameters of which will be adapted to the identified course of the surface.

Subsequently the voxels in a specified volume range on both sides of the preliminary determined surface will statistically be analyzed, preferably to define a probability function, with the help of which for each voxel in this or in other partial volumes of the image data record a probability may be calculated for that they are to be assigned to the cavity—interior space, to the cavity wall or (optionally) to the exterior space. For this purpose statistical processes for the determination of the a posteriori probability may be used such as they are also used for the evaluation of partial volume effects in very coarse resolution imaging processes, for example processes according to Bayes, as disclosed in IEEE Transactions on Image Processing, Vol. 4, No. 11, November 1995, p. 1531 in the article of Santago and Gage "Statistical models of partial volume effect". By way of this probability function the volume ratio of interior space and cavity wall within any desired partial volumes, especially of the volume segments described below, may be determined.

An advantage resides in that on the one hand a surface model is used to determine the volume range which is employed for the statistical analysis. On the other hand the result of said statistical analysis will preferably be used to correct the surface model by displacing or deforming the surface. As a consequence, the surface model will not necessarily any more image the actually detected contour of the interior surface but it optionally also considers structures which are located in the interior, in order to obtain a corrected surface model not precisely representing reality but very precisely reflecting the volume of the cavity.

An advantage resides in that it may be applied to different image environment modalities.

In order to perform the statistical analysis and especially the subsequent displacement of the surface of the surface model the surface of the preliminary surface model is preferably divided into surface segments. Volume segments will subsequently be defined each of which comprising a surface segment and extending from the latter radially inwards and/or outwards, mostly both inwards and outwards. For example the probability function mentioned above will then be applied to the voxels present in this segment and, on the basis of this, the associated surface segment will be deformed and/or displaced.

The basis is at least one, preferably a time series of several three dimensional (3D) image data records of the cavity or one or a time series of several stack(s) of two dimensional (2D) images of the cavity, respectively. The grey levels of the voxels of these images or image data records, respectively, are used in the statistical analysis. One or more 3D image data records are herein preferred, but the process may also be performed with 2D images which are located sufficiently close to each other if the positions in space thereof are known.

Preferably the image data record or the 2D picture(s) were obtained by a medical imaging process such as MRI, X-ray, PET or ultra sound, wherein both 2D and 3D and, appropriately time resolved, 4D procedures may be possible. Accordingly, the cavity preferably is a hollow organ or a cavity in the human body or in the animal body, respectively, for example a blood vessel, especially preferred the human heart or part of the same, especially a heart chamber.

However, the process is also applicable to other cavities, especially in the human body, e.g. large blood vessels, such as aorta, stomach, bladder, liquor space, spinal channel etc. Preferably moving cavities changing their volumes are comprised.

It is preferred that the process is not only performed with a 3D image data record or a stack of 2D images but also with a time series of several image data records or stacks of 2D images, respectively. In this case, the deformable surface model is also dynamic, i.e. it comprises alterations over time. In the case of the heart such a time series comprises for example two to fifty images and extends to at least one heart cycle. A dynamic analysis with a multitude of image data records/image stacks per heart cycle is possible, but relevant results also are allowed to be created by comparing the condition of the heart or the heart chamber, respectively, solely at two different times with each other, e.g. during each of systole and diastole.

In the case that the cavity is a heart chamber specific functional parameters of the heart activity will be obtained from the corrected surface model which was established from the time series, for example ejection fraction, minimal heart volume of the heart chamber, maximal volume of the heart chamber or other parameters which for one or more segments of the cardiac chamber wall may be determined in a locally resolved manner: local strain of the cardiac chamber wall, strain rate, velocity and bending of the cardiac chamber wall during contraction, local wall thickness, local wall thickening (rate of alteration of wall thickness) as well as each time to reach the respective maximal or minimal value of the parameters mentioned above, within one heart cycle.

Each of the preliminary as well as corrected surface model are preferably created as a parametric model (e.g. Spline Model), but a functional representation is also conceivable. Herein such a parametric model is referred to as a "bag".

In a time series of 3D image data records or stacks of 2D images, respectively, it is especially preferred for the preliminary surface model to be created as follows: On a first image or image data record of the time series, respectively, the interior space will be defined—by way of procedures such as edge detection or adaptive shape models. Specific striking structures will subsequently be identified on the interior surface, which will be tracked by a feature-tracking-process throughout all subsequent image data records or image stacks of the time series, respectively, thereby obtaining a preliminary dynamic surface model for all image data records within the time series—but including the inaccuracies mentioned above.

For each image within the time series the surface will then be divided into segments and the respective statistical analysis for correcting the surface model will be performed. Preferably the surface of the preliminary surface model will be divided into 10 to 30 respective surface segments according to a predetermined segment model. Especially for the left ventricle appropriate models with for example 20 segments exist, such as disclosed for example in FIG. 1 of the article "Wall motion and thickening by gated SPECT" of Sharir et al., The Journal of Nuclear Medicine, Vol. 42, No. 11, November 2001, p. 1630. A division into 17 segments is currently being established as a standard, see "AHA Scientific Statement: Standardized Myocardial Segmentation and Nomenclature for Tomographic Imaging of the Heart, A Statement for Healthcare Professionals From 5 the Cardiac Imaging Committee of the Council on Clinical Cardiology of the American Heart Association", American Heart Association Writing Group on Myocardial Segmentation and Registration for Cardiac Imaging: Manuel D. Cerqueira, M D; Neil J. Weissman, M D; Vasken Dilsizian, M D; Alice K. Jacobs, M D; Sanjiv Kaul, M D; Warren K. Laskey, M D; Dudley J. Pennell, M D; John A. Rumberger, M D; Thomas Ryan, M D; Mario S. Verani, M D; doi: 10.1161/hc0402.102975; 2002, 105:539-542 Circulation.

A volume segment will then be defined around each of these surface segments in a predetermined manner. The former may for example be limited by interior or exterior boundary surfaces, respectively, which each are inwardly or outwardly spaced apart, respectively, in the radial direction from the associated surface segment in a predetermined distance. Boundary surfaces will then extend laterally, for example substantially perpendicular to the surface segment. It is also possible to extend the segments inwards to the center of gravity of the cavity such that the volume segments will have a pie slice sort of shape.

In a preferred embodiment the steps d) to f) will be repeated at least one time, in order to segmentwise further adjust the corrected surface model. Preferably this will iteratively be repeated until no significant alteration of the surface model will arise.

In this process, the statistical analysis of the grey levels may be modified or refined, respectively, in each iteration to attain an even more precise assignment of the voxels contained in the volume segment to the interior space or cavity wall, respectively, i.e. in the case of the heart, to the blood tissue or heart muscle tissue, respectively. In order to attain this refinement it may be of advantage to redefine the volume segments in each iteration, for example by the inner and/or outer boundary surface keeping its predetermined distance to the surface segment, thus being included in the displacement following first iteration in an adjustment of the surface model.

As already mentioned above in the statistical analysis it will preferably be revealed which volume ratio will evolve between the volumes of the interior cavity (cavity of the interior space) and the cavity wall in the respective volume segment. This ratio will then be used to displace and/or deform the (geometrical) deformable surface model such that the volumes of the voxels on both sides of the model surface within the volume segment correspond to this ratio. The corrected surface model in turn may then be divided into appropriate surface segments. One may realize that the surface segment will be displaced/deformed such that the volume of the interior space will be located between the surface segment and the interior boundary surface, and the volume of the cavity wall or the heart muscle volume, respectively, will be located between the surface segment and exterior boundary surface. In this way, however, the surface segment will not be adapted to a detectable contour of the interior surface. The goal of the process thus resides in that the geometrically defined volume proportions will be adapted to the respective associated statistical volume proportions as precise as possible.

It may be of advantage herein to in turn define the entirety of all exterior boundary surfaces of all volume elements by way of a surface model which will be optimized in analogy to the surface model of the interior surface. The exterior surfaces of the volume segments are thereby brought closer to the exterior surface of the cavity wall, namely similarly, by a statistical analysis which not only takes into account the interior space and the cavity wall but also the exterior space, i.e. the voxels which due to their positions and/or their grey levels are likely not to belong to the cavity wall any more. The surface model for the exterior surface may initially be created, for example by the same above mentioned processes as the surface model for the interior surface, in order to subsequently be corrected according to the statistical analysis due to the determined volume proportion of the "exterior space" in the individual volume segments.

Optionally the same applies to the entirety of all interior boundary surfaces. Accordingly, an advantageous realization of the process could employ three surface models nested into each other like onion layers.

The disclosure also pertains to a device for the realization of the inventive process, including at least one data storage for storing the time series of 3D image data records or 2D image stacks, as well as one central processing unit for the automated or semi-automated realization of the steps b) to e) and optionally f).

Preferably the process will be performed fully automated. But semi-automated processes are also conceivable, wherein for example a user interaction will be required once to define a point on a 3D data record or on a 2D image which is located within the cavity to be analyzed.

The device thus has preferably one non-volatile data storage as well as one hard disc, one working memory and a processor unit such as for example a CPU. Furthermore input means such as a keyboard and/or mouse may be present for the representation of the preliminary and/or the corrected surface model. The latter will preferably be displayed on the screen as a perspective representation, optionally dynamically, to represent the alteration over time.

The device may preferably be any computer, especially a regular PC, a work station or the panel of a medical imaging device such as for example of a MRI-apparatus or an ultrasound apparatus. Network connection is also available to read the 3D image data records or the 2D image stacks.

Moreover the disclosure pertains to a digital storage medium onto which software code sections are stored which cause a computer to execute the process if the software is running on the computer. Preferably the storage medium is computer readable, such as for example a DVC or a CD-ROM. The disclosure also pertains to an appropriate computer program product having appropriate software code sections.

BRIEF DESCRIPTION OF THE DRAWINGS

An embodiment of the invention will now be described in details while reference is being made to the accompanying figures, wherein.

Equal parts are characterized by equal reference numbers.

DETAILED DESCRIPTION

The FIGS. 1-4 illustrate an embodiment of the invention by way of a single 2D image. It is understood that the process will of course be practiced with a 2D image stack or will appropriately be practiced best with one or more 3D image data records.

Figure 1:
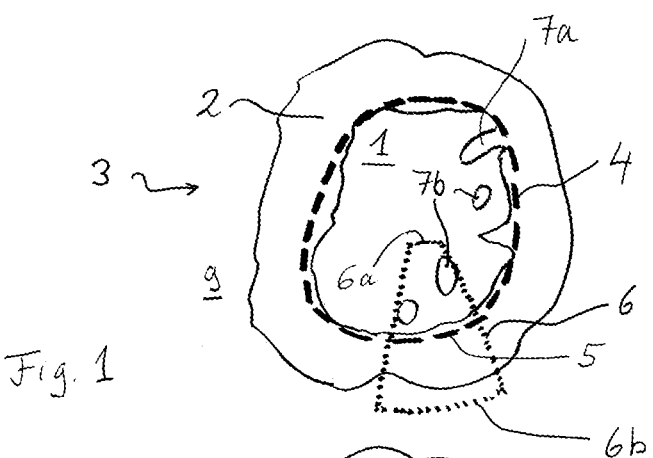
FIG. 1 is a short-axis section of the heart illustrating the preliminary surface model and a volume segment.
Figure 2:
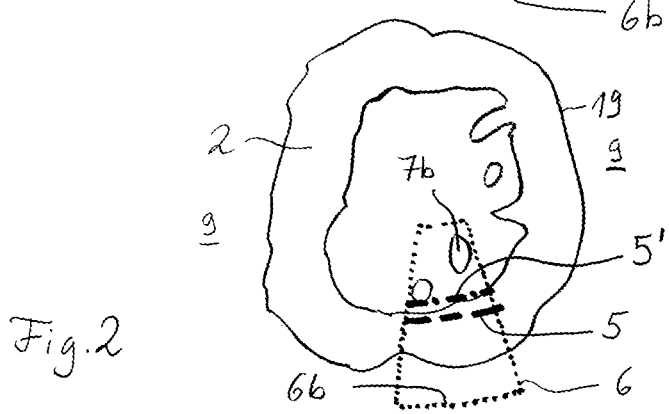
FIG. 2 is a short-axis section of FIG. 1 illustrating the preliminary surface model and a volume segment and a displaced associated volume segment.

FIG. 1 shows a short-axis section across a left ventricle 3 in a strongly simplified manner. The heart wall 2 encloses the interior space 1 of the cavity. Outside the cavity wall 2 the exterior space 9 is located. As can be seen from the figure the cavity 1 is however not smoothly edged, but the interior wall has protrusions 7a and in the cavity itself the structures 7b are located, for example trabeculae or papillary muscles. For this reason the preliminary surface model 4 drawn with a bold dashed line which was created by way of conventional processes, such as adaptive shape models, edge detection or 3D feature tracking is not precise, since the model intentionally is not described in details such that all protrusions 7a may be taken into account. Internally located structures 7b will fail to be taken into account by way of a closed surface model.

Moreover in FIG. 1 a cross-sectional view of a volume segment 6 is shown which includes a surface section or a surface segment 5, respectively, of the preliminary surface model. The interior boundary surface 6a extends up to the longitudinal axis of the cavity, the exterior boundary surface 6b in this example extends into the heart wall and even beyond the latter into the exterior space 9.

By way of all voxels and image elements, respectively, within the volume segment 6—or preferably by way of all voxels within some or all volume segments—a statistical analysis will now be performed wherein the probability function 18 will be calculated. Said analysis may for each voxel give a probability of belonging to the heart muscle tissue, and by way of this function it may globally provide a good evaluation of how high the proportion of interior space tissue or heart muscle tissue, respectively, will be in a specified volume segment.

For this it is not required to assign any one voxel either to the interior space or to the heart muscle. The probability function may suitably also be evaluated across the entirety of all voxels in the interior or exterior area, respectively.

By way of the thusly identified proportions the surface model of the cavity's interior surface will be displaced inwards to obtain the corrected surface model 5'. The statistically calculated volume proportion will thereby be preferably taken into account such that the ratio of said proportions will correspond to the ratio of the volume within the surface segment 5' to the volume of the volume segment which is located outside of the surface segment 5'. By "within" herein is meant the area which faces the cavity 1, and accordingly by "outside of" is meant the side of the surface segment 5' facing outwards.

Having now appropriately calculated the corrected positions for all surface segments 5 a corrected surface model may therefrom be generated which in turn may be divided into corrected surface segments. Occasionally this model may be refined by further iteration.

Figure 3:
FIG. 3 is the short-axis section of FIG. 1 with a redefined volume segment.

Moreover the position of the exterior boundary surface 6b of the volume segment 6 may also be adapted to the outside surface 19 of the cavity wall by the statistical analysis, as show in FIG. 3. This may be used to generate of a surface model for the exterior surface 19 of the cavity wall 2 and optimize it by the statistical processes described herein.

In the course of the iteration the division into surface elements and volume elements may be altered or refined, respectively, as shown in FIG. 3. New boundary surfaces will in turn be defined around the corrected surface element 5' thereby defining an appropriately adapted volume segment 6'. Within the volume segment 6' further statistical analysis may be redone and, similar to the first iteration, the surface segment 5' may occasionally be redisplaced or redeformed. If the surface model 4 allows high richness of detail diminishing of the surface elements 5 in each iteration may be advantageous. Accordingly, one may start with a relatively coarse and 'stiff' model 4 and may allow more and more details in the course of the iteration in the corrected surface model 8.

Figure 4:
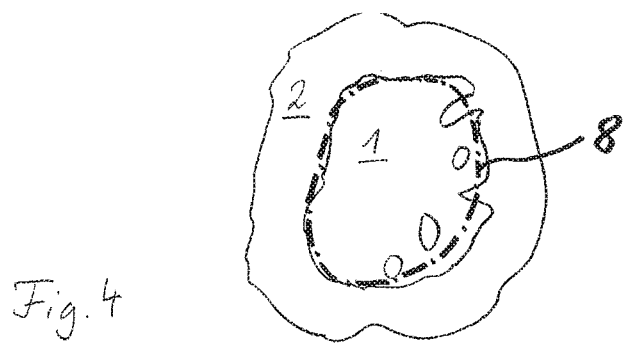
FIG. 4 is the short-axis section of FIG. 1 illustrating the corrected surface model.

The individual corrected surface segments 5' may then be combined into a corrected surface model 8 which is show in FIG. 4. As one can see from the figure the enclosed volume of the corrected surface model 8 highly corresponds to the actual volume of the cavity without requiring detailed modeling of the complex mixture of blood and muscle fibers.

In one advantageous embodiment the interior and exterior boundary surfaces 6a and 6b, besides the surface segments 5, may also be defined in their entirety as deformable surface models, being nested into each other like onion layers. Local deformations will then iteratively be performed with these surface models until the above mentioned goal will be attained for all regions. By way of such surface models previous knowledge concerning possible shape varieties of the article may be inputted, still enabling reasonable results even, for example, in local signal failures due to shading.

Figure 5:
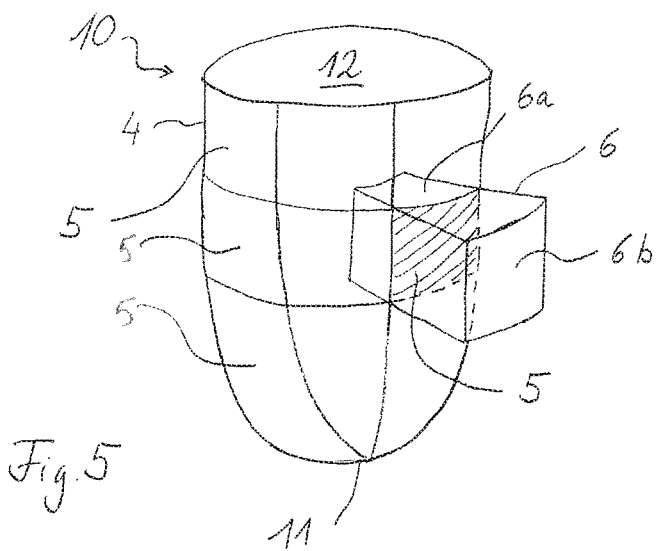
FIG. 5 is a perspective representation of a surface model of a heart chamber, divided into surface segments representing a volume segment.

FIG. 5 shows a perspective representation illustrating a preliminary surface model 4 as a bag representation 10. The model comprises a surface which is closed at the bottom (bag) and is sealed on top (i.e. where the mitral valve is located at the left ventricle) by way of a cover surface. The lower end 11 of the bag approximately corresponds to the apex of the left ventricle. As it is represented in the drawing, the bag surface is divided into segments 5. One of the surface segments is represented in hatched lines. The volume segment 6 which is associated to these surface segments 5 is also shown. This essentially has the shape of a pie slice (without tip) and is limited to the inside and to the outside by the interior boundary surface 6a and the exterior boundary surface 6b which essentially extend in the circumferential direction and are arranged radially offset to the interior and to the exterior from the surface segment 5 in the radial direction.

Figure 6:
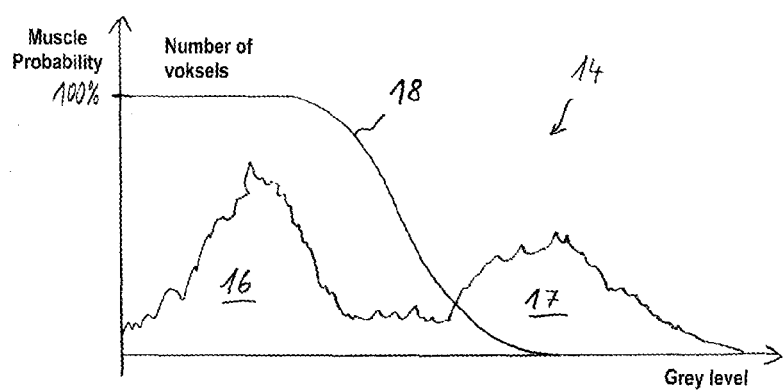
FIG. 6 is a voxel histogram of the grey levels of a volume segment of the heart.

FIG. 6 exemplifies a histogram of the voxels' grey levels in a volume segment wherein the number of voxels is plotted against said gray level. As can be seen the histogram 14 shows a first peak at low grey levels, the peak herein being assigned to the muscle tissue of the heart wall, and has a second local maximum 17 at higher grey levels, the maximum being assigned to the blood in the interior space. However, the local maxima are not sharply limited, merging into each other at the center such that by way of the grey level of a voxel precise assignment to each of blood and muscle tissue, respectively, is apparently not possible.

It is however possible to calculate a probability for that a specified voxel is to be assigned to the muscle tissue. This probability curve is referred to by 18 and is listed in the histogram. This probability curve allows calculation of a ratio between blood and muscle tissue in the volume segment even if an individual assignment of each individual voxel is not done.

Accordingly, for any one voxel constant assignment of belonging to the class "heart muscle" or "interior space" will be performed. Contrary to contour detection herein a binary threshold value decision will not necessarily be made. The respective class volume may subsequently be obtained by way of appropriately weighted integration across the observed image volume. This integration may also be performed across segments and may hence allow regional analyses. Accordingly the surface model herein on the one hand defines the region to be observed in the data record and on the other hand furthermore serves for the assignment of the local measurement by using a segment model.

It is preferred that an appropriate combination of surface model and grey level statistics will be performed for the determination of class probabilities.

The statistical analysis described above may for example be defined by the known a posteriori probability according to Bayes. Thus the process comprises the steps of:
1. Determining the histogram across the partial image range in question (e.g. heart muscle and enclosed blood-filled interior space) over a period of time, e.g. final diastole. It is preferred that the partial image range comprises more than only one volume segment, e.g. a specified volume range on both sides of the surface of the preliminary surface model.
2. Determining a bimodal mixed distribution as an approximation of the histogram with the single distributions of the both classes
   P(grey level|heart muscle)
   P(grey level|blood)
3. Identifying the a posteriori probability (herein as an example for the probability to represent a point within the cavity, given the measured grey level)

$$P(\text{blood}|\text{grey level}) = \frac{P(\text{grey level}|\text{blood})P(\text{blood})}{P(\text{blood})}$$

4. Measuring the blood volume by way of weighted integration (muscle volume analogously)

The result may either be used directly in volume data records or solely as a factor of proportionality for the ratio of blood to muscle (which percentage of the obtained volume is to be evaluated as 'blood'?). In the latter case the volume measured by the surface model may thereby be post-calibrated. Especially for data of low spatial scan such as CMRI this post-calibration has the advantage that the geometrically defined volume of the surface model may be corrected by way of the smaller sample volume. In this way the advantages of the geometric model and the analysis of the voxel data will be combined. A solely voxel based analysis does for example not allow taking into account knowledge of geometrical shapes thus allowing false entering of structures which are not to be assigned to either the heart wall or the blood volume enclosed into the analysis or the calculation, respectively, of the probability function.

It is to be understood that the analysis described above may also be applied to regional partial volumes according to the established segment models. In this way correction of the regional volume calculation is also possible.

The advantages reside in that the constant observation of the grey levels allow partial volume calculation even in the case when a clear separation line or boundary surface, respectively, between interior space and hollow wall may not reasonably be identified.

Furthermore errors in defining the preliminary surface model may be corrected. This will facilitate both definition and generation of the same since it does not have to be very precise, and also calculation of the dynamic time volume subsequent to a feature tracking since errors from the feature tracking process may be compensated.

The correction may both be performed globally and regionally. The inter and intra-observer variability will decrease.

The invention claimed is:

1. A computer-implemented process for calculating the volume of a cavity surrounded by a cavity wall, wherein the cavity is a heart chamber, the method comprising the steps of:
   a) accessing at least one of several three-dimensional image data record/records of the cavity or one of several stack/s of two-dimensional images of the cavity;
   b) creating a preliminary deformable surface model of the interior surface or an exterior surface of the cavity wall for each 2D image data record or each stack of 2D images, respectively;
   c) dividing the surface of the preliminary surface model into surface segments;
   d) defining volume segments each including one surface segment and extending radially inwards and/or outwards from their associated surface segment;
   e) statistical analysis of grey levels of voxels in a specified volume range on both sides of the surface of the preliminary surface model and therefrom identifying the volume proportions of cavity wall, cavity—interior space and/or exterior space in the respective volume segments, wherein the statistical analysis determines a histogram of grey levels and gives an a posteriori probability for a voxel within the volume range to represent a point of the cavity wall, the cavity interior space and/or the exterior space,
   f) calculating the blood volume in the cavity interior space, the volume of the cavity wall and/or the volume of the exterior space in a volume segment by weighted integration of the voxels in the volume segment, wherein the volume of each voxel is weighted with the a posteriori probability of cavity interior space, cavity wall, and/or exterior space in the respective volume segment, as determined by the statistical analysis;
   wherein the method is carried out by a central processing unit of a computer.

2. The computer-implemented process according to claim 1, wherein in the statistical analysis it is determined in which ratio to each other the volumes of interior space and heart muscle in the respective volume segment are present.

3. The computer-implemented process according to claim 1, wherein each volume segment is limited in a radial direction by an interior and exterior boundary surface, respectively, which are spaced apart to an interior and to the exterior direction from the associated surface segment in a predetermined distance.

4. The computer-implemented process according to claim 1, wherein a corrected surface model of the interior surface of the cavity wall is created, wherein additionally a model of the exterior surface of the cavity wall is created for each 3D image data record or each stack of 2D images, respectively, namely by displacing the exterior boundary surfaces of the volume segments onto the exterior surface of the cavity wall.

5. The computer-implemented process according to claim 4, wherein in the statistical analysis of the grey levels of the voxels the volume proportions of the cavity wall, cavity interior space and exterior space in the individual volume segments are determined, and the volume proportion defines the displacement of the exterior boundary surface.

6. The computer-implemented process according to claim 1, wherein the cavity is a heart chamber and the time series of several 3D image data records of the cavity or a time series of several stacks of two dimensional images of the cavity are used and wherein the corrected surface model is created for each time of the time series.

7. The computer-implemented process according to claim 6, wherein from the corrected surface model functional parameters of the heart activity are obtained, namely at least one comprising ejection fraction, minimal heart volume of the heart chamber, maximal volume of the heart chamber, or one of the following parameters which each may be determined in a locally resolved manner for several segments of the cardiac chamber wall: local strain of the cardiac chamber wall, strain rate, bending of the cardiac chamber wall during systole, torsion, velocity of the cardiac chamber wall during contraction, local wall thickness, local wall thickening (rate of alteration of wall thickness) as well as each time to reach the respective maximal or minimal value of the parameters mentioned above within one heart cycle.

8. A device for the realization of the process according to claim 1, comprising:
   a data storage for storage of the time series of two- or three-dimensional images; and
   a central processing unit for automated or semi-automated realization of the steps b) to e).

9. A non-transitory digital computer readable storage medium onto which software code sections are stored which cause a computer to execute the process according to claim 1 if the software is running on the computer.

10. The computer-implemented process according to claim 1, wherein the preliminary surface model is divided into 10 to 30 surface segments according to the predetermined segment model.

11. The computer-implemented process according to claim 1, wherein the surface of the preliminary surface model is divided into surface segments according to a predetermined segment model.

* * * * *